United States Patent [19]

Hofmann et al.

[11] Patent Number: 4,643,405
[45] Date of Patent: Feb. 17, 1987

[54] TWO-CHAMBER ENGINE MOUNT WITH HYDRAULIC DAMPING

[75] Inventors: Manfred Hofmann, Hünfelden; Giacomo Sciortino, Mühlheim Kärlich, both of Fed. Rep. of Germany

[73] Assignee: Metzeler Kautschuk GmbH, Munich, Fed. Rep. of Germany

[21] Appl. No.: 783,323

[22] Filed: Oct. 2, 1985

Related U.S. Application Data

[63] Continuation of Ser. No. 556,634, Nov. 30, 1983, abandoned.

[30] Foreign Application Priority Data

Nov. 30, 1982 [DE] Fed. Rep. of Germany ....... 3244295

[51] Int. Cl.[4] .................... F16F 1/36; F16F 15/04
[52] U.S. Cl. ..................................... 267/8 R; 188/379; 267/63 A; 267/140.1
[58] Field of Search ............ 267/8 R, 35, 63 R, 63 A, 267/64.23, 64.27, 113, 140.1, 141, 141.3, 141.4, 141.5, 141.6, 141.7, 152, 140.2, 140.3, 153, 8 B, 8 C, 8 D, 8 A, 9 R, 9 B, 9 A, 9 C, 10; 188/378, 379, 380; 248/562, 565, 566, 636

[56] References Cited

U.S. PATENT DOCUMENTS

| | | | |
|---|---|---|---|
| 4,159,091 | 6/1979 | Le Salver et al. ............. | 267/113 X |
| 4,288,063 | 9/1981 | Brenner et al. ................ | 267/8 R |
| 4,352,487 | 10/1982 | Shtarkman .................. | 267/140.1 X |

FOREIGN PATENT DOCUMENTS

| | | | |
|---|---|---|---|
| 2652501 | 5/1978 | Fed. Rep. of Germany ... | 267/63 A |
| 2802896 | 7/1979 | Fed. Rep. of Germany .... | 267/63 R |
| 2947018 | 5/1981 | Fed. Rep. of Germany ... | 267/140.1 |
| 2500555 | 8/1982 | France ............................. | 267/64.23 |
| 56-66539 | 6/1981 | Japan ............................... | 267/140.1 |
| 56-143839 | 11/1981 | Japan ............................... | 267/140.1 |

*Primary Examiner*—Duane A. Reger
*Assistant Examiner*—Richard R. Diefendorf
*Attorney, Agent, or Firm*—Herbert L. Lerner; Laurence A. Greenberg

[57] ABSTRACT

A two-chamber engine mount with hydraulic damping, includes a housing, an intermediate plate disposed in the housing dividing the housing into an upper chamber above the intermediate plate and a lower chamber below the intermediate plate to be filled with fluid, the intermediate plate having a damping opening formed therein hydraulically interconnecting the chambers for preventing a hydraulic response upon the occurrence of high frequency and low amplitude vibrations, upper and lower rubbery elastic peripheral walls at least partially defining the upper and lower chambers, respectively, a motor support plate adjacent the upper chamber, the support plate having a membrane chamber centrally formed therein, and a rubbery membrane separating the membrane chamber from the upper chamber, the rubbery membrane including a solid central quenching mass.

3 Claims, 7 Drawing Figures

TWO-CHAMBER ENGINE MOUNT WITH HYDRAULIC DAMPING

This application is a continuation of application Ser. No. 556,634 filed Nov. 30, 1983, now abandoned.

The invention relates to a two-chamber engine mount with hydraulic damping, especially for motor vehicles, having two fluid-filled chambers provided with rubber-elastic peripheral walls hydraulically interconnected through an intermediate plate having a throttling or damping opening formed therein for preventing a hydraulic response at high frequency vibrations with a small amplitude, and an additional chamber separated from the upper chamber by a membrane.

An engine mount of this type is known from European Published Application EP-A-0044 545. This motor mount is provided with an elastically-supported intermediate plate and a valve which closes automatically at high pressure, for ensuring that the mount does not respond hydraulically to high frequency vibrations with small amplitudes, and that such vibrations are only slightly damped, while at vibrations of lower frequencies and increasing amplitudes, increased damping occurs, due to an increased fluid exchange. Furthermore, the elastic support of the intermediate plate provides a hydraulic neutralization of small amplitudes to a small degree, up to a frequency range of about 200 Hz, thereby enhancing the acoustic behavior.

Another device for achieving a hydraulic neutralization is disclosed in German Published, Non-Prosecuted Application DE-OS No. 26 18 333, wherein an annular space is provided in the cover cap of the fluid chamber at the motor side, in vicinity of the outer periphery, the annular space being separated from the fluid chamber by a membrane. However, the hydraulic neutralization obtained in this way is only effective at very high frequencies above 400 Hz, and therefore has practically no effect for the range of up to 400 Hz, which is actually of interest.

The most important requirements for an optimal engine mount are the absorption of starting and braking moments, the absorption of forces introduced by uneven road conditions, the avoidance of free-wheeling vibrations, and good isolation from sound conducted through the body. This amounts to a requirement that the engine mount has either high stiffness or high damping, which is a requirement having an acoustically negative effect for the isolation of the dynamic mass forces of the motor. This is because a soft support is required for a good isolation of body noise.

Therefore, in principle, the following two conditions are to be met, namely a high damping action in the low frequency range (up to about 30 Hz), and on the other hand low stiffness in the high frequency range above 30 Hz. Since only small amplitudes occur in this case, the requirement for the best possible isolation is dominant.

It is accordingly an object of the invention to provide a two-chamber engine mount with hydraulic damping, which overcomes the hereinafore-mentioned disadvantages of the heretofore-known devices of this general type, which is constructed in such a way that high damping takes place at large vibration amplitudes, and that, especially at small amplitudes, an optimal isolation of the acoustic behavior as well as of the induced vibrations is assured.

With the foregoing and other objects in view there is provided, in accordance with the invention, a two-chamber engine mount with hydraulic damping, especially for motor vehicles, comprising a housing, an intermediate plate disposed in the housing dividing the housing into an upper chamber above the intermediate plate and a lower chamber below the intermediate plate to be filled with fluid, the intermediate plate having a throttling or damping opening formed therein hydraulically interconnecting the chambers for preventing a hydraulic response upon the occurence of high frequency and low amplitude vibrations, upper and lower rubbery elastic peripheral walls at least partially defining the upper and lower chambers, respectively, a motor support plate adjacent the upper chamber, the support plate having a membrane chamber centrally formed therein, and a rubbery membrane separating the membrane chamber from the upper chamber, the rubbery membrane including a solid central vibration quenching mass.

In accordance with another feature of the invention, the rubbery membrane is annular, and the quenching mass is in the form of a circular metallic disc retained by the annular membrane.

In accordance with a further feature of the invention, the rubbery membrane is formed of soft rubber with a Shore-A-hardness of substantially 25 to 45, especially 30 to 38.

In accordance with an added feature of the invention, the rubbery membrane has a progressive spring constant.

In accordance with an additional feature of the invention, the membrane chamber is closed off from the surroundings.

In accordance with again another feature of the invention, the membrane chamber is filled with gas under an adjustable pressure.

In accordance with a concomitant feature of the invention, the membrane chamber is filled with a fluid.

A hydraulically damped engine mount constructed in this manner makes it certain that a high damping action takes place when motor vibrations with large amplitudes are introduced, and that at small amplitudes, i.e. in the range of 0.1 mm, an optimal isolation of the acoustic behavior as well as an optimal isolation of the induced vibrations, is assured.

Other features which are considered as characteristic for the invention are set forth in the appended claims.

Although the invention is illustrated and described herein as embodied in a two-chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
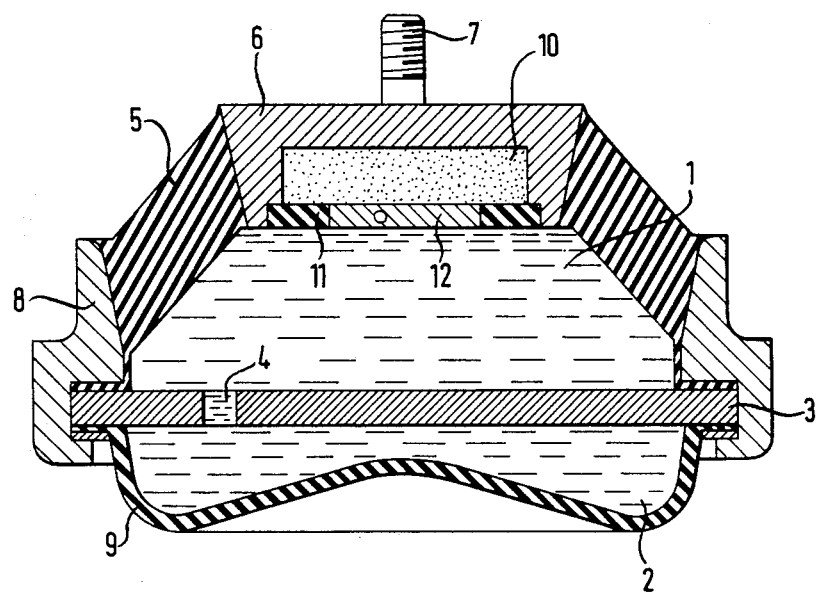
FIG. 1 is a diagrammatic, cross-sectional view of a two-chamber engine mount.

Referring now to the figures of the drawing in detail and first particularly to FIG. 1 thereof, there is seen a two-chamber engine mount constructed according to the invention, which is essentially formed of an upper chamber 1 at the motor side and a lower chamber 2. The chambers are filled with hydraulic fluid and are separated from each other by an intermediate plate 3 having a damping or throttling opening 4 formed therein. The upper chamber 1 is formed by a thick chamber wall 5 in the form of a hollow cone made of a rubber elastic material. The hollow cone is closed at the top thereof by a motor support plate 6 including a threaded bolt 7 on top, and is permanently connected at its lower outer periphery to an annular counter support member 8. The lower chamber 2 is formed by a chamber wall 9 which, for example, is cup-shaped. The wall 9 is also made of a rubber elastic material and is connected to the support member 8 in a leakproof manner. The intermediate plate 3 is also rigidly supported in the member 8.

According to the invention, a cylindrical hollow space 10 is provided at the bottom of the motor support plate 6. The space 10 is closed off from the upper chamber 1 by an annular rubber membrane 11 with a central quenching or damping mass 12. In the embodiment shown, the quenching or damping mass 12 is in the form of a round metallic disc, and is retained by the annular rubber membrane 11. The membrane 11 is preferably formed of a soft rubber with a Shore-A-hardness of substantially 25 to 45, and an optimal operation is obtained at a Shore-A-hardness of substantially 30 to 38. The hollow space 10, which will be referred to as a membrane chamber below, is closed off from the surroundings and is filled with a gas or a fluid with a low density. The pressure in this membrane chamber can therefore correspond to the atmospheric pressure, or a higher pressure may be applied to it for a suitable damping condition.

In order to explain the function and the mode of operation of this engine mount, a model of physical forces and the equivalent hydraulic force model are illustrated in the drawings.

Figure 2:
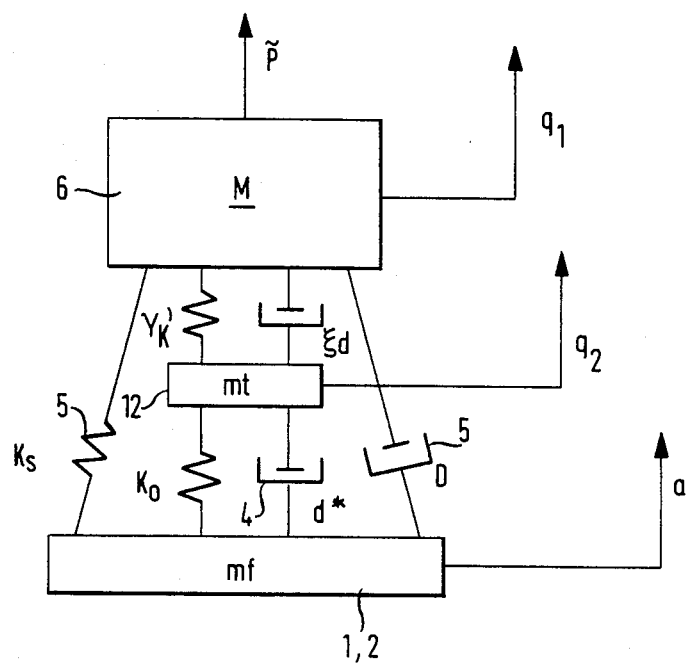
FIG. 2 is a representation of physical forces present in such an engine support.

In the physical force model according to FIG. 2, the engine mass M acts on the motor support plate 6 and performs the motion $q_1$, being coupled with the equivalent mass mf of the hydraulic fluid in the chambers 1 and 2 through the elastic rubber chamber wall 5, which has a static stiffness $K_s$ and a mechanical damping D. The mass mt of the quenching mass 12 is disposed parallel to the above-mentioned mass M and the equivalent fluid mass mf. The mass mf experiences the motion or acceleration $q_2$, in dependence on the parameters discussed below. The coupling of the quenching mass mt to the engine mass M is effected by a spring equivalent K', which represents the complex stiffness of the membrane chamber 10, plus the spring constant of the elastic support 11 of the quenching mass 12, as well as the constant of the characteristic function of the damping d of the quenching system, which is dependent on the degree of damping of the elastic support of the quenching mass mt, and on the degree of damping of the hollow space 10 which is filled with a gas or a fluid.

The coupling of the quenching mass mt to the equivalent mass mf of the fluid is dependent on the value of the spring characteristic $K_o$, i.e. of the volumetric stiffness or stiffness per unit volume of the upper chamber 1 in conjunction with the throttling orifice 4, and its characteristic function d*. This characteristic function is dependent on the geometric configuration of the throttling orifice, especially its length and its diameter, and it is also dependent on the type of flow and the specific mass of the fluid, which in turn depend on inertia and the ratio of the volumetric stiffness of the upper and lower chambers 1 and 2. The characteristic value $\gamma$, i.e. the ratio of the complex stiffness K' of the quenching system and the coupling spring $K_o$, as well as the characteristic value $\xi$, which specifies the damping ratio or efficiency ratio of the characteristic value d of the quenching mass mt and the characteristic function d* of the throttle, are also important for the function and operation of the system.

Figure 3:
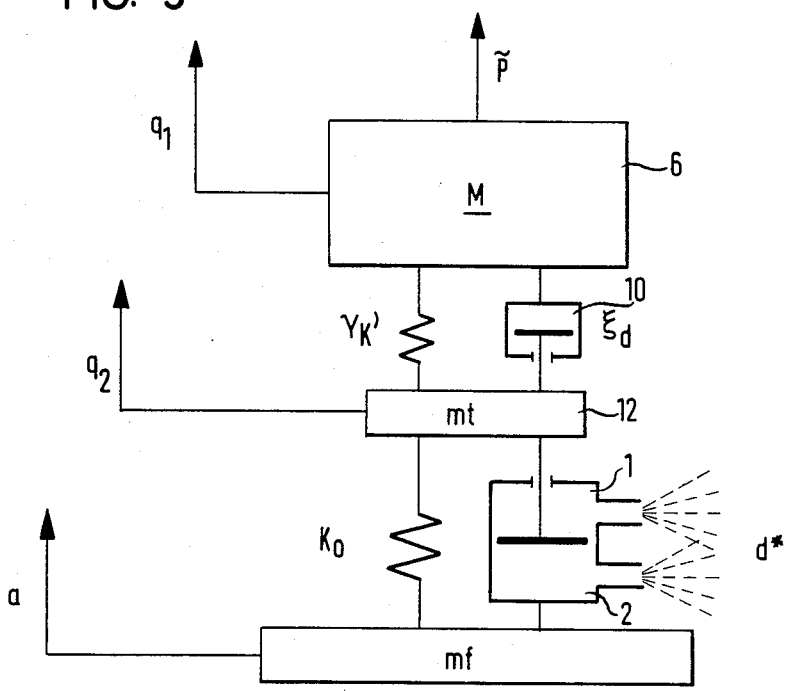
FIG. 3 is a representation of equivalent hydraulic forces of the engine mount.

In the equivalent hydraulic model according to FIG. 3, the coupling of the quenching mass mt to the engine mass M and to the equivalent mass mf of the fluid, are again illustrated. The damping d of the membrane chamber 10 and the throttle-damping d* between the upper chamber 1 and the lower chamber 2, as well as the corresponding coupling springs K' and $K_o$, are shown.

The two-chamber engine mount according to the invention provides high damping when motor vibrations with large amplitude are induced, due to the fluid exchange through the throttle 4. However, in the case of small amplitudes of an order of magnitude of 0.1 mm with high frequencies, no fluid exchange takes place, so that optimal isolation of the acoustic behavior as well as isolation of the induced vibrations, is assured. The support system as set forth according to the invention therefore utilizes the non-linearity of the hydraulic damping force, which is defined by the acceleration of the fluid through the throttle, and its effect on the equivalent fluid mass.

The mass of the fluid thus generates a dynamic force which is caused by the motion $q_1$ of the engine and the acceleration $q_1$ of the engine, and the acceleration of the fluid caused thereby through the damping system which is in the form of the throttle 4. This dynamic force acts as hydraulic pressure on the elastically-supported quenching mass 12, or on the quenching system formed of the quenching mass 12, the rubber membrane 11 and the gas-filled membrane chamber 10, which bulges out or buckles when a load is applied, and vibrates as one mass, even if the load is taken off. The sine-exciter function is represented by the equation:

$$\epsilon = \int Kd\, dq = \int Kd\, \dot{q}\, dt$$

wherein:
  $\epsilon$ = Energy generated by a hydraulic force Kd by means of an exciter-amplitude q in the upper chamber 1.

If the elastically-supported quenching mass 12 vibrates with a phase which is the opposite of the exciter, i.e. of the fluid mass in the chambers 1 and 2, then the whole system has reached its maximum efficiency, and complete hydraulic decoupling or neutralization is effected. By fine tuning and structuring this hydropneumatic system, a quenching effect can be achieved in a much broader frequency range than with conventional systems. The result is an acoustic behavior which is especially considerably improved.

In order to choose a goal for the desired decoupling or neutralizing frequency range, especially important tuning parameters to be considered are the quenching mass 12, the volume of the membrane chamber 10, the density of the gas or fluid contained therein, the flexural stiffness of the elastic support of the quenching mass 12 (which can be regulated by increasing the spring constant of the rubber membrane 11, as well as by adjusting the ratio of the area of the quenching system to the active area of the upper chamber 1) and finally the ratios $\gamma$ and $\xi$, and the rubber membrane 11 which behaves optimally when rubber with a Shore-A-hardness of 30 to 38 is used, and which is to be considered along with these ratios.

Figure 5:
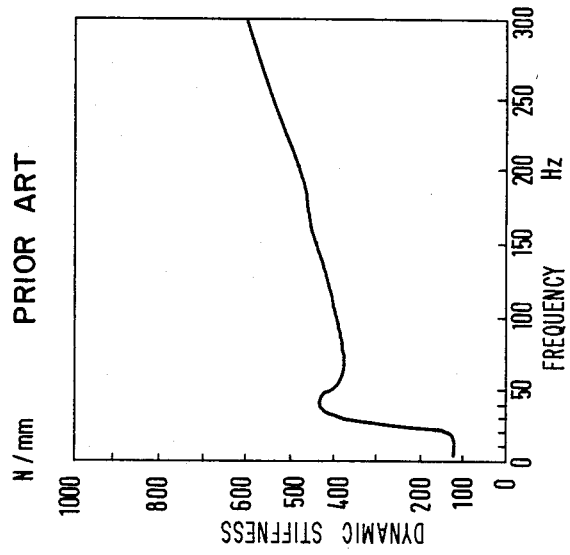
FIGS. 4 and 5 are diagrams of the damping and stiffness of conventional non-neutralized or non-decoupled hydraulic mounts.
Figure 4:
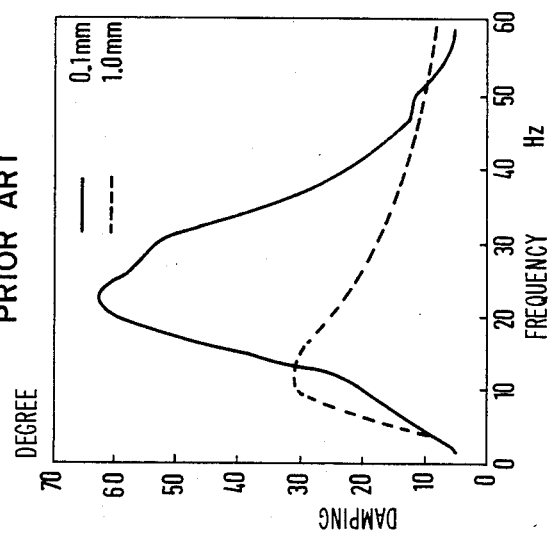

In the diagrams according to FIGS. 4 to 7, the damping action and the dynamic stiffness are plotted against the frequency for a conventional non-neutralized hydraulic mount, and for a neutralized hydraulic mount as set forth according to the invention. As shown in FIGS. 4 and 5, in which the damping and the dynamic stiffness are respectively plotted against the frequency for a non-neutralized conventional hydro-mount, an increase of the damping with a reduction of the amplitude, as well as an increase of the dynamic stiffness, which then remains approximately constant, is experienced as shown, though an opposite behavior would be desirable.

Figure 7:
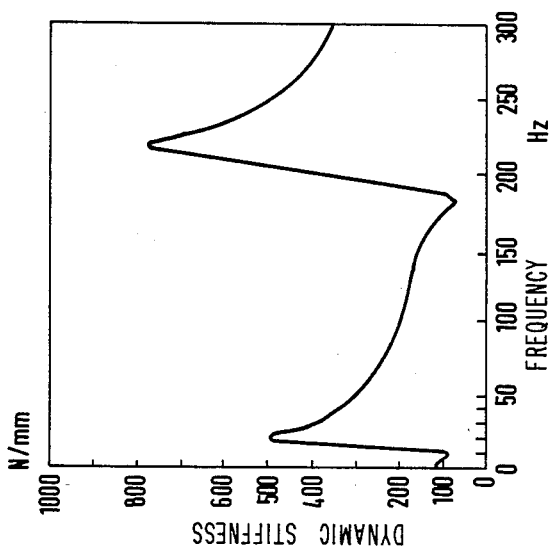
FIGS. 6 and 7 are diagrams of the damping stiffness of neutralized or decoupled hydraulic mounts according to the invention.
Figure 6:
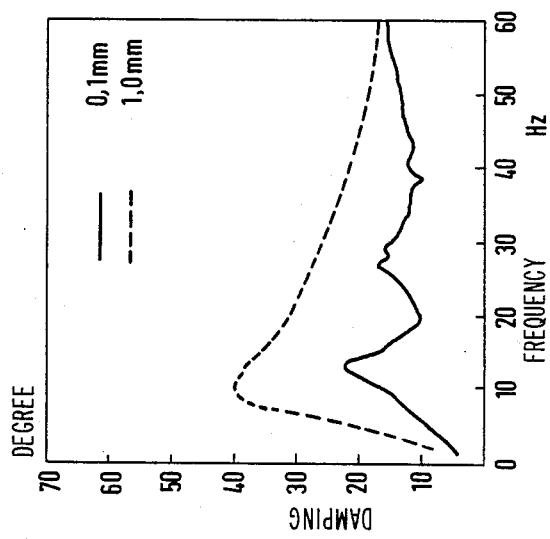

In contrast to this, FIGS. 6 and 7 show the behavior of the damping and the dynamic stiffness for a neutralized hydraulic mount according to the invention, which shows that although the damping-maximum remains approximately the same, in this case good damping occurs at high amplitudes and low frequencies, and a good acoustic behavior is assured at low amplitudes and high frequencies. Accordingly, the damping decreases with decreasing amplitudes. The behavior of the dynamic stiffness is of special interest, because in this case the stiffness drops sharply after a short rise, and according to the illustrated embodiment, the desired decoupling occurs at about 180 Hz, while the dynamic stiffness drops below the constant value for the static stiffness. By changing the above-described parameters with this system, a controlled decoupling or neutralizing at a desired frequency can be achieved within wide limits.

In summary, an engine mount is obtained according to the invention, wherein high vibration amplitudes of the motor are strongly damped, the damping maximum can be placed at the self-resonance frequency of the motor, and the hydraulic damping is neutralized at small amplitudes, so that an optimal acoustic behavior is obtained.

We claim:

1. Two-chamber engine mount with hydraulic damping, comprising a housing, an intermediate plate disposed in said housing dividing said housing into an upper chamber above said intermediate plate and a lower chamber below said intermediate plate to be filled with fluid, said intermediate plate having a damping opening formed therein hydraulically interconnecting said chambers for preventing a hydraulic response upon the occurrence of high frequency and low amplitude vibrations, upper and lower rubbery elastic peripheral walls at least partially defining said upper and lower chambers, respectively, a motor support plate having a bottom surface directly adjacent and partially defining said upper chamber and a top surface opposite said bottom surface, said support plate including a membrane chamber centrally formed in said bottom surface and extending partially to said top surface, said membrane chamber being pressure-tightly closed off from the surroundings, and a rubbery membrane separating said membrane chamber from said upper chamber, said rubbery membrane having a progressive spring constant, and a solid central quenching mass enclosed by said rubbery membrane.

2. Two-chamber engine mount according to claim 1, wherein said rubbery membrane is annular, and said quenching mass is in the form of a circular metallic disc retained by said annular membrane.

3. Two-chamber engine mount according to claim 2, wherein said rubbery membrane is formed of soft rubber with a Shore-A-hardness of substantially 25 to 45.

* * * * *